(12) United States Patent
Maurice

(10) Patent No.: US 11,127,433 B2
(45) Date of Patent: Sep. 21, 2021

(54) SYSTEM AND METHOD FOR EMBEDDING VERSATILE GRAPHICS

(71) Applicant: IChannel.IO Ltd., Petah Tikva (IL)

(72) Inventor: Oren Maurice, Yoqneam Moshava (IL)

(73) Assignee: ICHANNEL.IO LTD., Petah Tikva (IL)

( * ) Notice: Subject to any disclaimer, the term of this patent is extended or adjusted under 35 U.S.C. 154(b) by 117 days.

(21) Appl. No.: 16/626,711

(22) PCT Filed: Mar. 19, 2018

(86) PCT No.: PCT/IL2018/050315
§ 371 (c)(1),
(2) Date: Dec. 26, 2019

(87) PCT Pub. No.: WO2018/173046
PCT Pub. Date: Sep. 27, 2018

(65) Prior Publication Data
US 2021/0193183 A1    Jun. 24, 2021

Related U.S. Application Data

(60) Provisional application No. 62/473,503, filed on Mar. 20, 2017.

(51) Int. Cl.
*G11B 27/036* (2006.01)

(52) U.S. Cl.
CPC .................. *G11B 27/036* (2013.01)

(58) Field of Classification Search
CPC ............. G11B 27/036; G06F 17/30825; G06F 17/30864; G06F 3/0484
See application file for complete search history.

(56) References Cited

U.S. PATENT DOCUMENTS 9,275,016 B1    3/2016 Freund
2005/0084232 A1*    4/2005 Herberger ............ G11B 27/031
386/282

(Continued)

OTHER PUBLICATIONS

The International Search Report and The Written Opinion of the International Searching Authority, dated Jul. 12, 2018, ISA, Jerusalem, Israel.

*Primary Examiner* — Thai Q Tran
*Assistant Examiner* — Jose M Mesa
(74) *Attorney, Agent, or Firm* — M&B IP Analysts, LLC

(57) ABSTRACT

A system and method for embedding versatile graphics in a digital media file. This is performed by a system that contains a processor and a memory coupled thereto where the memory contains spaces therein for data and instructions. Data areas include: an infographic repository; a tables repository; a templates repository; and, a projects and outcomes repository. The instructions, when executed by the processor perform: obtaining a video project comprising rendering instructions and indication of an image and at least one replaceable infographic; obtaining the image that was indicated; obtaining the at least one replaceable infographic that was indicated from the infographic repository; rendering a clear template from the templates repository; rendering a plurality of pattern images; generating a pixel's mapping table in the tables repository for each replaceable infographic of each frame of the clear template; and, retaining the clear template in the templates' repository and the tables in the tables repository of each replaceable infographic of each frame of the clear templates.

10 Claims, 9 Drawing Sheets

(56) References Cited

U.S. PATENT DOCUMENTS

2010/0153520 A1* 6/2010 Daun .................. G11B 27/034
709/218
2015/0078947 A1 3/2015 Perez
2015/0318020 A1* 11/2015 Pribula ................ H04N 9/8205
386/227

* cited by examiner

SYSTEM AND METHOD FOR EMBEDDING VERSATILE GRAPHICS

CROSS-REFERENCE TO RELATED APPLICATIONS

This application claims priority under 35 U.S.C. § 371 to the International Application No. PCT/IL2018/050315, filed Mar. 19, 2018, which claims the benefit of U.S. Provisional Application No. 62/473,503 filed on Mar. 20, 2017, the contents of which are hereby incorporated by reference.

TECHNICAL FIELD

The present disclosed subject matter relates to video editing. More particularly, the present disclosed subject matter relates to embedding versatile graphic information (infographic) to digital video stream.

BACKGROUND

As television shifts to an internet-based medium (i.e., Internet Protocol television (IPTV), content becomes more readily available to address the increasing expectations of consumers and advertisers. Besides delivering high quality high definition content over the internet, content distributors can provide viewers with opportunity for engagement during live casting. For example, viewers can pause and resume a program; see what topics would be covered during a program, program status, remaining time for each topic a combination thereof, or the like. Thus, the IPTV allows for live TV interactivity, whereas satellite and cable broadcasts, at most, are very limited in this area. Additionally or alternatively, the casting of IPTV programs can be distributed entirely on video on demand basis so distributors can drive an entire show's rundown based on hot topics that their viewers are interested in. Unlike satellite content providers, IPTV distributor is territory adaptive and thus can broadcast a particular sport event, for example, all over the world, while matching the subtitles and tailoring the commercials per region.

Video streaming technology provides IPTV content distributors with information of who is watching as well as where and when a program is being watched. Coupling this information with interactivity and viewer engagement helps distributors to tune programs for real time audience growth. Since, advertisers are looking for measurable returns on investment, which is an advantage for IPTV networks. IPTV distributors can build data collection and clickable advertisements into their programming to help advertisers monetize content, which will also help build real time demographic information that benefit advertisers.

It is estimated that the amount of live video streaming entities will surpass two million channels by the end of 2018. Such entities includes: news & journalism, universities & schools, sports leagues & clubs, religious & faith, shows & exhibitions, finance, science & health, travel & leisure, and the like. In light of the above, it is highly desirable that post-production process of filmmaking and television production will be facilitated with systems and methods for adding graphics and animations on top of video streams, either in order to personalize the feeds with different data for different users and different regions, or to add information to a video stream such as a logo, "next show", scores during a sports match.

Low cost, commercially available, tool for adding graphic information on top of a video feed typically use HTML5 rendering. The results of such HTML5 rendering exhibits poor visual quality and non-smooth motion, moreover, utilizing such tool requires software programming skills, which are different from the skills set users trained in the art of cinema and TV editing. On the other hand high-end graphics rendering equipment is very costly and thus, narrows the service of graphic information adding to limited providers, subsequently increasing the cost of service. Furthermore, this commercially available high-end equipment require: special training, heavy computerized resources, and lengthy process due to the need of transforming the graphical information to a proprietary formats. Similar to high-end equipment, applications using scripting of graphics authoring also require heavy computerized resources as well as licensing. The need for licensing, possibly, many copies of the rendering application, and the fact that the animations must be rendered ahead of time, disqualifying it for real-time oriented use such as sport-match results.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1A:
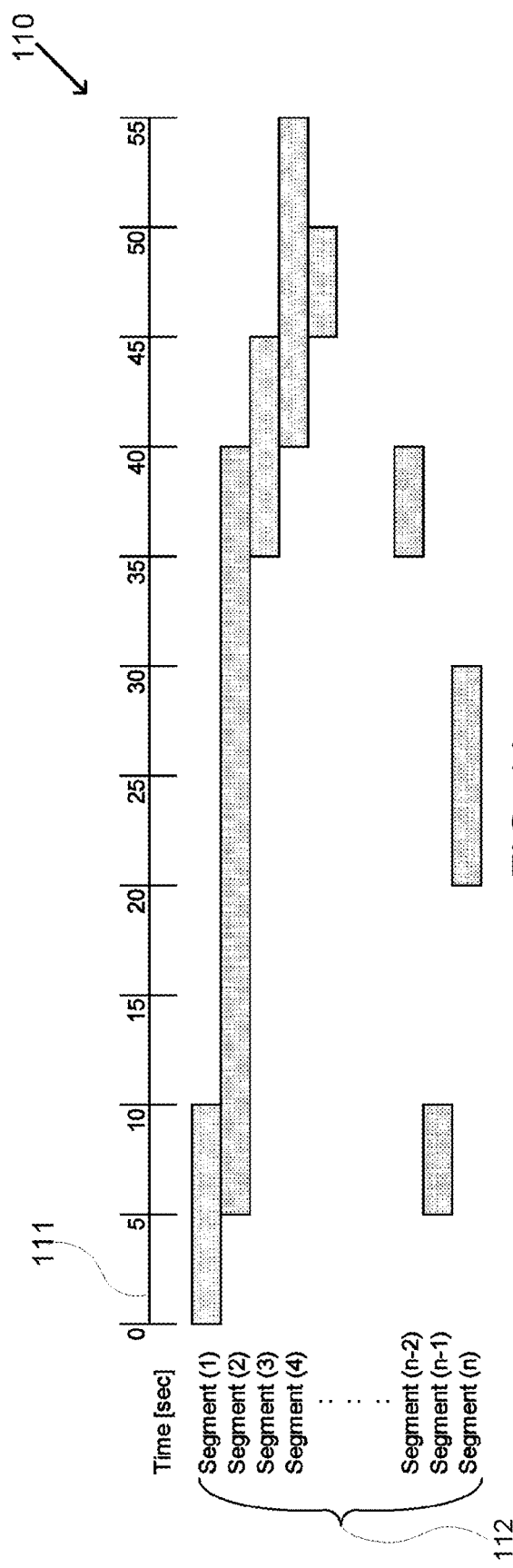
FIG. 1A illustrates an example of a video project, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

One technology advancement affect, resulting from utilizing the present disclosure is: the capability of adding versatile graphic information (infographic) on top of a video feed with affordable equipment (infographic embedding system), while sustaining visual quality and smooth motion, typically accredited to high end equipment.

Another technology advancement affect, resulting from utilizing the present disclosure is: providing an infographic embedding system that reduces computational overload and subsequently reducing capital expenditure. Thus, open the market, of cinema and TV online editing, to small enterprises and central locations. Furthermore the present disclosure conform with commonly used image/video file formats and doesn't require converting video files and infographic to proprietary formats prior to executing the disclosed subject matter. Therefore, obviating the need for licensing accelerates the editing process and reduces operational expenditure.

Yet another technology advancement affect, resulting from utilizing the present disclosure is: a straight forward user's interface that doesn't require software programming skills or additional expertise besides the knowledge of a person skilled in the art of cinema and TV editing. The present disclosure is real-time oriented system intended for TV live casting and streaming. It should be also noted that, the algorithm of the present disclosure system "cuts to the chase" and directly manipulate each frame at the pixel level.

Referring now to FIG. 1A that illustrates an example of a video project 110, in accordance with some exemplary embodiments of the disclosed subject matter. The video project 110 may be a graphic representation of at least two segments 112 wherein the at least two segment 112 are aligned, like a film strip, along a time domain 111. It will be noted that, in the present disclosed subject matter, the term "segment" refers to at least one object or a composition of rendered objects. An object may be, for example, a video scene, a video clip, text string, still images, a file representing film footage, graphic information file (infographic), a combination thereof, or the like.

In some exemplary embodiments, rendering the segments will yield a video file, which can be played on, computerized, controlled, screens. Wherein, rendering is the process of generating a digital video file by combining objects and/or segments outlined, as graphics pipeline, along a time domain 111. In the present disclosed subject matter, infographic are objects/segments used for adding, versatile, graphic information to a video stream. In some exemplary embodiments, infographic can be animations, still images, visual effects, dynamic transitions, video clips, two dimensions bitmap file (2DBM), text string, a combination thereof, or the like.

The video project 110 may be a representation of a commercially available video editing software application which handles editing of digital video sequences Editing applications are typically based on, but not limited to, a timeline interface paradigm where segments 112 of the video file are laid out in sequence. Typically, a video project allows users to trim, splice, cut, add and manipulate objects, segments and infographic across the timeline. Upon, editing completion the segments 112 of video project 110 can be rendered into a variety of digital video file formats, such as AVI, ASF, MOV, AVCHD, FLV, SWF, MPEG, MPEG-4, WMV, H.264, DIVX, or the like.

Figure 1B:
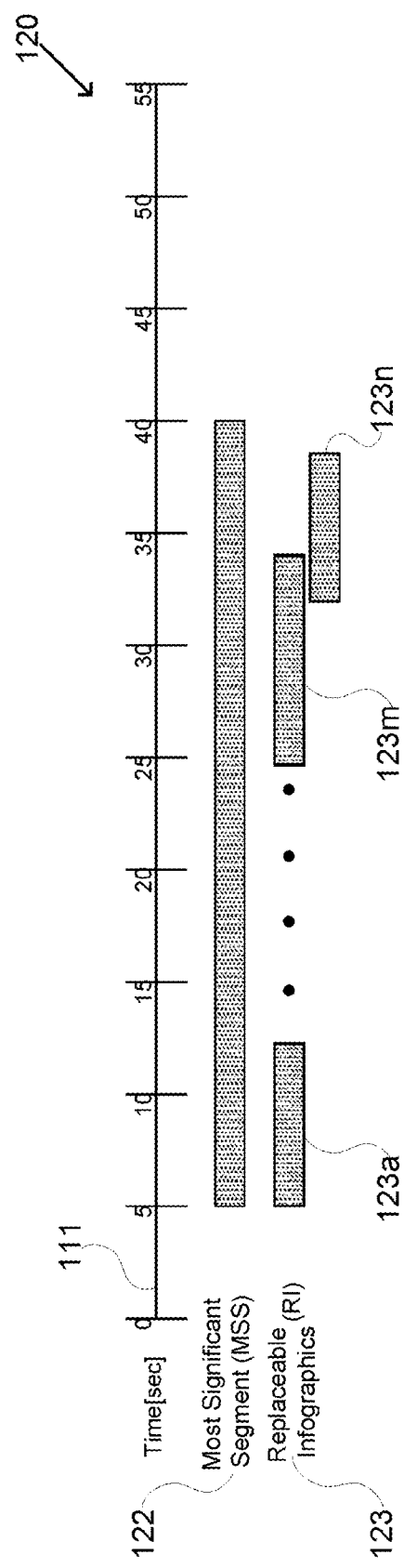
FIG. 1B illustrates an example of a template, in accordance with some exemplary embodiments of the disclosed subject matter.

It will be noted that, the present discloser uses, in FIGS. 1A and 1B, representations that are similar to commonly used video editing application. However it does not imply that the present discloser utilizes such application. The sole purpose of these representations, in the present disclosure, is to assist in understanding the elements involve in the, previously described, video project 110 and template 120, described below. Also, video project 110 and template 120 may be visualized as raw data on which additional information may be added to, prior to casting or streaming it in any electronic media.

Referring now to FIG. 1B that illustrates an example of a template 120, in accordance with some exemplary embodiments of the disclosed subject matter. Template 120 may be a graphic representation, similar to video project 110, comprising a most significant segment (MSS) 122 and at least one replicable infographic (RI) 123, which are both selected by a user. The MSS 122 and at the least one RI 123, are aligned, like a film strip, along a time domain 111.

In some exemplary embodiments, the template 120 may be derived from the video project 110 following selection of the MSS 122, by a user of the system provided in the present disclosure. Additionally, the at least one RI 123 may have been originally, segments of video project 110, which were selected by the user as RI 123, i.e. infographic that may be replaced by insert infographic. Similar to the replicable infographics (RI) the insert infographics are also files of graphic information, except that, insert infographic files may be created or selected by a user of the present discloser.

It will be noted that, the sizes of the replicable infographics may differ from one another, and thus it is advisable that each insert infographic will match its equivalent replicable infographic in terms of size and resolution.

In some exemplary embodiments, the most significant segment (MSS) 122 may be a segment; comprising the most relevant scene, object, the main scene, the whole feed, a composition thereof, or the like; that a user choose to edit prior to streaming or casting.

It should be noted that, the "insert infographic" may be used with parameters; such as geometric location, various sorts of image warping, color modulation, a combination thereof, or the like of an RI, on one or more frames of a digital video/image file. It should be also noted that in the present disclosed subject matter a frame is one of a plurality of still images, which compose a digital video, such as a collection of raster graphics/images, or any video file. The frame may be perceived as a screen shot, thus the frame can be a rectangular matrix of pixels.

In some exemplary embodiments, objects such as each segment 112 of the example depicted in FIG. 1A as well as MSS 122, RI 123$a$, RI 123$m$ and RI 123$n$ of the example depicted in FIG. 1B are digital image or video files. In which, each file may comprise at least one frame assembled as a rectangular matrix of pixels. Attributes, such as: "where the file is retained?" are indicated in the video project 110 and the template 120 representations. Thus, the video project 110 or the template 120 may be a file that list objects and their attributes for rendering an output video file from the files listed in either the video project 110 or the template 120 (representations). In some exemplary embodiments, objects can be added to a representation, subtracted from the representation or modified; by editing the list of objects and/or its attributes. Modified objects and newly added objects are new files represented by their attributes.

Figure 2A:
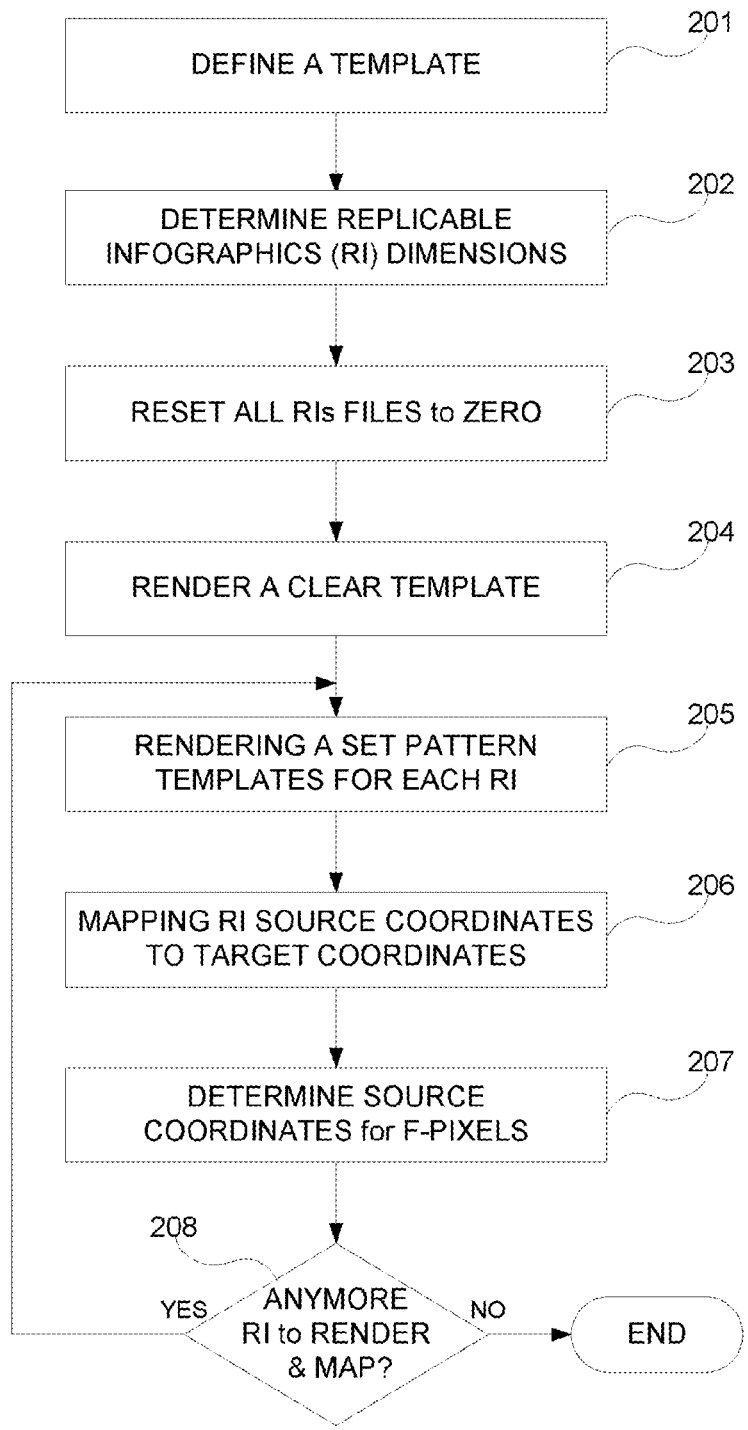
FIG. 2A shows a flowchart diagram of a method for embedding infographics, in accordance with some exemplary embodiments of the disclosed subject matter.

Referring now to FIG. 2A that shows a flowchart diagram of a bar method for embedding infographics, in accordance with some exemplary embodiments of the disclosed subject matter.

In Step 201, a template, such as for example template 120 of FIG. 1B, may be defined. In some exemplary embodiments, a user may define the template by selecting an MSS, and at least one RI, such as MSS 122 and RI 123, of FIG. 1B, respectively.

In Step 202, X-Y dimensions of each selected RI, such as RI 123 of FIG. 1B, may be determined. In some exemplary embodiments, the X-Y dimensions are given in the X (width) number of pixels by Y (height) number of pixels of any given RI. The X-Y dimensions may be obtained from the properties of each RI 123 file.

It should be noted that each pixel is encoded in RGBA color space, comprising of the following four fragments: red (R), green (G), blue (B) and alpha (A). Compositions between the values of R, G and B fragments determine the color of the pixel; while the values of the (A) fragments determine the transparency of the pixel. For example, if R=G=B={max._value} the pixel color will be white; if R=G=B=0 the pixel color will be black; A={max._value} gives a fully opaque pixel; and A=0 gives a fully transparent pixel.

In Step 203, all the RI 123 files (of the defined template 120) may be reset to transparent (zero). In some exemplary embodiments, the alpha value of each pixel of each RI 123 file are set to zero, i.e., making the content of all RI 123 files transparent. In some exemplary embodiments, the original RI 123 files may be archived.

In Step 204, a clear template may be rendered. In some exemplary embodiments, a template 120, comprising MSS 122 and all the transparent RI 123 are rendered to form the clear template. Depending on the type of MSS 122, the clear template may result as video file or as an image file e.g., Photoshop or the like.

Referring now to FIGS. 3A to 3D and, FIGS. 4A to 4D that illustrate examples of horizontal and vertical patterns respectively, in accordance with some exemplary embodiments of the disclosed subject matter. Each pattern of the patterns depicted in FIGS. 3A to 3D and, FIGS. 4A to 4D may be graphic representation of an image that may be visualize on viewing device, such as television set, computer screen, or the like. The graphic representation content, such as color, shape, size and other parameters characterizing each pattern may is digital information stored as a computer file.

A pattern (horizontal or vertical) may be viewed as a matrix of pixels having a size (dimensions) that is measured by the number of pixels on X axis by the number of pixels on Y axis. For example, a 256 by 128 pattern is a pattern, wherein X=256 pixels and Y=128 pixels, thus the total number of pixels in the pattern, of this example, is 256×128=32,768 pixels. It should be noted that, the Y axis indicates rows of the matrix while the X axis indicates column of the matrix.

In some exemplary embodiments, each pattern is comprised of repeated identical cyclic shapes, wherein the color of the shapes alternate from black to white and vice versa. Thus, each horizontal pattern; such as any of the horizontal patterns depicted FIGS. 3A to 3D; sustains constant width ($\delta x$) of both the white and black shapes. Likewise, each vertical pattern; such as any of the horizontal patterns depicted FIGS. 4A to 4D; sustains constant height ($\delta y$) of both the white and black shapes.

Figure 3A:
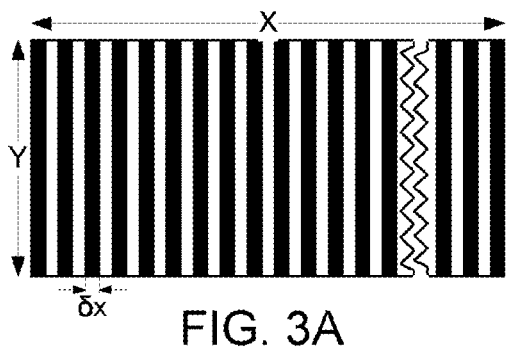
FIGS. 3A to 3D, illustrate examples of horizontal patterns, in accordance with some exemplary embodiments of the disclosed subject matter.
Figure 4A:
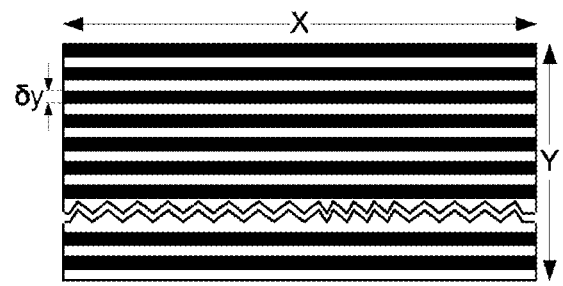
FIGS. 4A to 4D, illustrate examples of vertical patterns, in accordance with some exemplary embodiments of the disclosed subject matter.
Figure 3B:
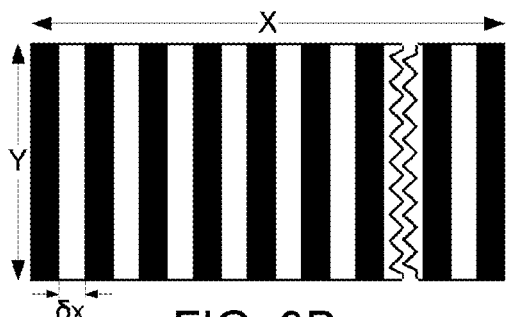
Figure 4B:
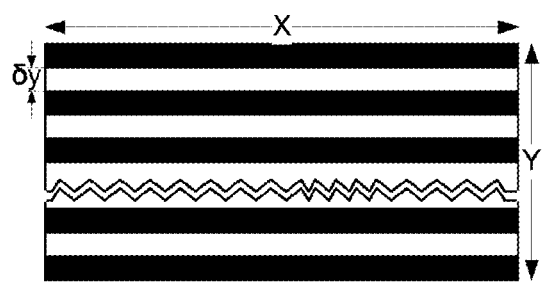
Figure 3C:
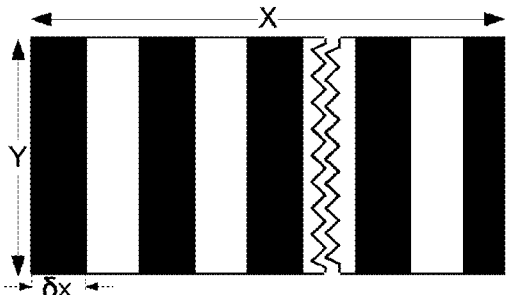
Figure 4C:
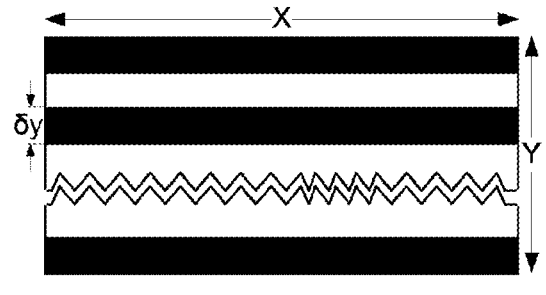
Figure 3D:
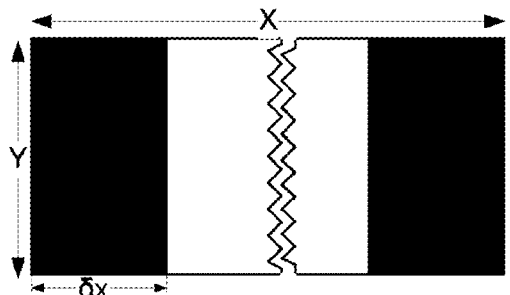
Figure 4D:
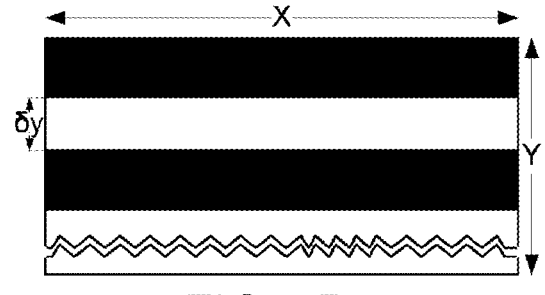

As an example; the shape size, of FIG. 3A example, may be: $\delta x$=1 pixel by Y=128 pixels; the shape size, of FIG. 3C example, may be: $\delta x$=32 pixel by Y=128 pixels; the shape size, of FIG. 4B example, may be $\delta y$=4 pixel by X=256 pixels; the shape size, of FIG. 4D example, may be $\delta y$=64 pixel by Y=256 pixels.

It should be noted that, the value of X, Y, δx and δy must always be equal to equation $2^n$, wherein (n) is an integer.

In some exemplary embodiments, the present discloser system for embedding infographics in a video project, may utilize at least one plurality of patterns, wherein the dimensions (X-Y) of all the patterns (horizontal and vertical alike) of the plurality of patterns are identical, however, different in shape from each other. Each plurality of patterns, of the at least one plurality of patterns, may be associated to a specific RI 123, because the dimensions of deferent RI 123 may differ from one another.

Returning back to FIG. 2A. In Step 205, a set of horizontal and vertical patterns renderings may be rendered for each RI 123. In some exemplary embodiments, a rendered pattern comprises the clear template and all the RI 123. Wherein the content of one RI 123, such as RI 123*a*, was replaced with content of pattern (1P), and the rest of the RI 123 remain transparent. It should be noted that 1P is the first pattern of a plurality of horizontal and vertical patterns that are associated with the RI123*a*.

The rendering result may be a file labeled as "pattern-rendering 1P of RI 123*a*" which may be stored in rendering's repository. It will be noted that these "renderings" files may be stored in lossless storage, ensuring that their values will not alter at all, while retaining and retrieving these files.

The process, depicted above, may be repeated for a second pattern (2P), of the patterns associated with RI123*a*, and may be labeled as "rendering 2P of RI 123*a*". Similarly, the process continue until the last pattern rendering, of the set patterns-rendering, associated with RI123*a*, i.e. "rendering [last]P of RI 123*a*", is rendered and stored. Upon completion of rendering RI 123*a* with all the patterns, the entire processes, depicted above, may be repeated for the next RI 123, and so on until the last pattern rendering of the last RI 123*n* is rendered and stored as "rendering [last]P of RI 123*n*". Thus, the rendering's repository will comprise a set of patterns renderings for each RI 123.

Additionally or alternatively, two additional patterns, a black (B) pattern and a white (W) pattern, may be added to the plurality of patterns of each RI123. It will be noted B and W patterns are patterns in which each pixel of the RI are either black or white respectively. In some exemplary embodiments, the process of rendering (creating) patterns renderings (depicted above) may be employed to add a "rendering BP" and a "rendering WP" to the patterns renderings set of each RI 123.

In some exemplary embodiments, the number of the plurality of patterns, associated with a given RI 123, corresponds to the X-Y dimensions of the given RI 123, i.e. the number of pixels on X axis by the number of pixels on Y axis. The total number of patterns for any given RI 123 is given by: ceiling($\log_{(2)}X$), plus ceiling($\log_{(2)}Y$), plus one BP and plus one WP.

Referring again to the example depicted in FIG. 1B, where there are, for example, three replaceable infographics RI 123*a*, RI 123*m* and RI 123*n*, each of which have, for example, the following dimensions:
a) The total number of patterns for RI 123*a*, wherein X=500; Y=60, are: ceil$\{\log_{(2)}500\}$+ceil$\{\log_{(2)}60\}$=9 X patterns+6 Y patterns+1 BP+1WP=17 patterns.
b) The total number of patterns for RI 123*m*, wherein X=240; Y=222, are: ceil$\{\log_{(2)}240\}$+ceil$\{\log_{(2)}222\}$=8 XP+8 YP+1 BP+1WP=18 patterns.
c) The total number of patterns for RI 123*n*, wherein X=100; Y=200, are: ceil$\{\log_{(2)}100\}$+ceil$\{\log_{(2)}200\}$=7 XP+8 YP+1 BP+1WP=17 patterns.

According to the example above, a total of 17 patterns rendered files may be obtained for RI 123*a*, i.e. 18 different patterns renderings, plus one black and one white pattern renderings. Similarly, 18 for RI 123*m* and 17 for RI 123*n*, which comes to a total of 53 including the clear template file.

In light of the definition, previously described, of a frame it will be understood that, rendered renderings files are video files that are composed of frames. It will also be understood that, a frame is an array of pixels, having rows and columns, wherein each pixel is identified (indexed) by column (x) and row (y) numbers it is corresponding to. For example, an RGBA value of pixel (367;189) is the value of a pixel situated where column 367 and row 189 intersect. The terms "position" and "coordinates" of a any given pixel (x;y) may be loosely used in the present disclosure, however they mean the same.

In some exemplary embodiments, pixel (0;0) refers to the pixel at the top left side of a frame, while pixel ([last column];[last row]) refers to the pixel at the bottom right side of the frame.

In step 206, source coordinates of RI 123 may be mapped to the target coordinates. In some exemplary embodiments, the mapping may be viewed as a position pointer that is pointing on a position, for each pixel having source coordinates, on the target coordinates of each MSS frame. Thus, the mapping determines the position in which an insert infographic associated with a given RI 123 may be embedded.

In some exemplary embodiments, pixels having values that are equal to corresponding pixels in corresponding frames, of the clear template, black and white renderings of a given RI, may be discarded.

It should be noted that, in the present disclosure, corresponding pixels are pixels in corresponding frames that have the same coordinates, providing that sizes of the corresponding frames are identical. It will be understood that, in the present disclosure the size (height and width) of all the frames in a given video project, such as video project 110 of FIG. 1A are identical. Moreover, the amounts of frames in all the rendered renderings are equal, since all the renderings, of a given video project, were based on the same MSS 122 duration. Because the amount of frames in all renderings is equal, the frames may be similarly indexed, and thus, corresponding frames are frames of different renderings that have the same index.

In some exemplary embodiments, the remaining (were not discarded) pixels of frames associated with RIs pattern renderings may be populated into tables, such as the example of the "pixel's mapping table" below. Each "pixel's mapping table" may be designated to a specific frame of a specific RI; thus, for each video project, the total amount of mapping table, stored in a so called "modified pixels table" repository, is the product of the number of frames by the number of RI.

The rows of the table may index, at the left column, the (x;y) coordinates of the remaining pixels in the specific frame ($FR_i$) of the specific RI123 ($RI_j$). It should be noted that, these (x;y) coordinates are also referred to as target coordinates.

The columns of the table may index, at the header row, the pattern renderings as well as the white and black renderings, wherein the first two columns are designated to pixel's RGBA values resulted from the white pattern and black pattern renderings rendering. Each given pixel in each (XP and YP) patterns renderings column may be populated based upon the rendered value of the given pixel, with respect to the WP and BP rendered values of the given pixel.

In some exemplary embodiments, if the rendered value of the given pixel falls within a range of its white value plus/minus a threshold (TH) the value "1" may be populated. If the rendered value of the given pixel, falls within a range of its black value plus/minus the (TH) the value "0" may be populated. If the rendered value of the given pixel falls outside the white and the black ranges, the value "F" (for fail) may be populated. In some exemplary embodiments, a pixel having at least one "F" may be defined as an F-pixel, i.e. a pixel with undetermined source coordinates.

In some exemplary embodiments, a thresholds may be given by:

$$TH = \frac{|[WP] - [BP]|}{3},$$

wherein [WP] and [BP] are the values of the given pixel taken from its white pattern and black pattern renderings respectively.

and the Y patterns rendering columns. Wherein the first pattern-rendering of X and the first pattern rendering of Y are the least significant bits.

In step 207, source coordinates for F-pixels may be determined. In some exemplary embodiments, the source coordinates of each F-pixel may be done by determining whether each cell, of the table, populated with "F", can be replaced by "1" or "0" value. The determining may be done by utilizing conventional interpolation algorithms; such as spatial interpolation, linear interpolation, a combination thereof, or the like; of neighboring pixels. In some exemplary embodiments, this determining may be utilized also for the rest of the cells, i.e. cells that were not populated with "1" or "0".

In some exemplary embodiments, the patterns renderings rendering (of Step 5) for each RI 123 may be done in a batch mode, which ends upon rendering and retaining all the patterns renderings of all the RI 123, prior to proceeding to

PIXEL'S MAPPING TABLE

| $FR_i$; $RI_j$ | | | Source Pixels Coordinates | | | | | | |
|---|---|---|---|---|---|---|---|---|---|
| Target Pixels Coordinates | WP pixel Value | BP pixel Value | $1^{st}$ XP | $2^{nd}$ XP | Last XP | $1^{st}$ YP | $2^{nd}$ YP | ... | Last YP |
| $x_i;y_i$ | $[RGBA]_{i,i}$ | $[RGBA]_{i,i}$ | 1 | 0 | ... 0 | 1 | 0 | ... | F |
| $x_j;y_i$ | $[RGBA]_{j,i}$ | $[RGBA]_{j,i}$ | 1 | 0 | ... 0 | 1 | 0 | ... | 1 |
| . | . | . | . | . | .... | . | . | | . |
| $x_{n-1};y_i$ | $[RGBA]_{n-1,i}$ | $[RGBA]_{n-1,i}$ | 1 | 0 | ... 0 | 1 | 0 | ... | 1 |
| $x_n;y_i$ | $[RGBA]_{n,i}$ | $[RGBA]_{n,i}$ | 1 | 0 | ... 0 | 1 | 0 | ... | 1 |
| . | . | . | . | . | .... | . | . | | . |
| $x_i;y_j$ | $[RGBA]_{i,j}$ | $[RGBA]_{i,j}$ | 0 | 0 | ... F | 0 | 0 | ... | 0 |
| $x_j;y_j$ | $[RGBA]_{j,j}$ | $[RGBA]_{j,j}$ | 0 | 0 | ... 0 | 0 | 0 | ... | 0 |
| . | . | . | . | . | .... | . | . | | . |
| $x_{n-1};y_j$ | $[RGBA]_{n-1,j}$ | $[RGBA]_{n-1,j}$ | 0 | 0 | ... 0 | 1 | 0 | ... | 0 |
| $x_n;y_j$ | $[RGBA]_{n,j}$ | $[RGBA]_{n,j}$ | 0 | 0 | ... 1 | 1 | 0 | ... | 0 |
| . | . | . | . | . | .... | . | . | | . |
| $x_i;y_{n-1}$ | $[RGBA]_{i,n-1}$ | $[RGBA]_{i,n-1}$ | 0 | 1 | ... 1 | 1 | 1 | ... | 0 |
| $x_j;y_{n-1}$ | $[RGBA]_{j,n-1}$ | $[RGBA]_{j,n-1}$ | 0 | 1 | ... 1 | F | 1 | ... | 0 |
| . | . | . | . | . | .... | . | . | | . |
| $x_{n-1};y_{n-1}$ | $[RGBA]_{n-1,n-1}$ | $[RGBA]_{n-1,n-1}$ | 1 | 0 | ... 0 | 0 | 0 | ... | 1 |
| $x_n;y_{n-1}$ | $[RGBA]_{n,n-1}$ | $[RGBA]_{n,n-1}$ | 1 | 1 | ... 0 | 0 | 1 | ... | 1 |
| . | . | . | . | . | .... | . | . | | . |
| $x_i;y_n$ | $[RGBA]_{i,n}$ | $[RGBA]_{i,n}$ | 1 | 1 | ... F | F | 1 | ... | 1 |
| $x_j;y_n$ | $[RGBA]_{j,n}$ | $[RGBA]_{j,n}$ | 1 | 1 | ... 1 | 1 | 1 | ... | 1 |
| . | . | . | . | . | .... | . | . | | . |
| $x_{n-1};y_n$ | $[RGBA]_{n-1,n}$ | $[RGBA]_{n-1,n}$ | 1 | 1 | ... 1 | 0 | 1 | ... | 1 |
| $x_n;y_n$ | $[RGBA]_{n,n}$ | $[RGBA]_{n,n}$ | 1 | 1 | ... 1 | 0 | 1 | ... | 1 |

Upon, populating completion of all the "pixel's mapping tables" (frames) of the given RI 123, each table may be labeled with its frame number and RI 123 number {modified pixels table of [frame #;RI #] } and stored. In some exemplary embodiments, a table may be used for mapping RI 123 source coordinates to the target coordinates. The source (x;y) coordinates may be established from binary values, (ones and zeros) formed in the X patterns rendering columns Step 206. Additionally or alternatively, the patterns templates rendering (of Step 5) may be done in a single RI mode, which ends after rendering and retaining all the patterns renderings of a single RI 123, prior to proceeding to Step 206. Likewise, the mapping (of Step 6) of each RI 123 may be done in a batch mode, which ends upon mapping all the frames of all the RI 123, prior to proceeding to Step 207. Additionally or alternatively, the mapping (of Step 6) may be done in a single RI mode, which ends after mapping all the frames of a single RI 123, prior to proceeding to Step 207.

In Step 208, the rendering and mapping of all replicable infographics may be competed. In some exemplary embodiments, steps 205, 206 and 207 may be repeated until all the patterns renderings of all RI 123 have been rendered as well as the mapping of all the frames of the RI 123 are completed.

Figure 2B:
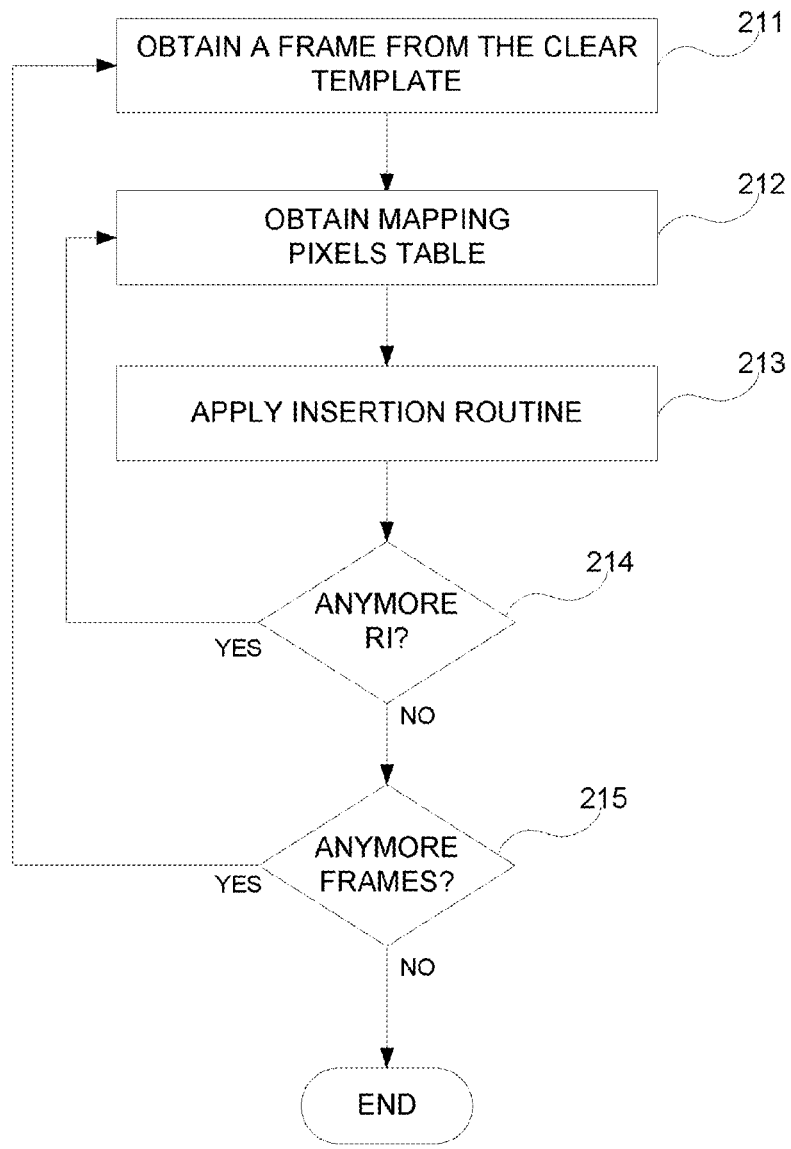
FIG. 2B shows a flowchart diagram of a method for embedding infographics, in accordance with some exemplary embodiments of the disclosed subject matter.

Referring now to FIG. 2B showing a flowchart diagram of a method for embedding infographics, in accordance with some exemplary embodiments of the disclosed subject matter.

In Step 211 a frame of the clear template may be obtained. In some exemplary embodiments: initially, the first frame of a sequence of frames comprising the clear template may be obtained and stored, in the same sequential order, in an outcome rendering file (ORF), which may be an outcome of the infographics embedding method. It should be noted that, Step 211 may be repeated for each frame ($FR_i$), wherein in each repetition, the following frame ($FR_{i+1}$) may be retrieved and stored, and so on, until the last frame.

In Step 212, a pixel's mapping table of an RI123 may be obtained. In some exemplary embodiments, the modified pixels table of the first RI123 of a frame corresponding with the previously retrieved frame (Step 211) may be obtained. It should be understood that, the target pixel index points the pixel's address in a given frame of the ORF, while the source pixel index points the pixel's address in a given RI123.

In Step 213, the insertion routine may be applied. In some exemplary embodiments, based on the following formulas and pixel's mapping table, the insertion routine may be applied to replace all the pixels of the given RI123 with insert infographic in the given frame of the ORF, thus updating/retaining embedded infographic in the outcome rendering file ORF.

$$R_t = R_b A_i + R_s(1-A_i) + (R_w - R_b) A_i R_i \quad \text{a.}$$

$$G_t = G_b A_i + G_s(1-A_i) + (G_w - G_b) A_i G_i \quad \text{b.}$$

$$B_t = B_b A_i + B(1-A_i) + (B_w - B_b) A_i B_i \quad \text{c.}$$

$$A_t = A_b A_i + A_s(1-A_i) + (A_w - A_b) A_i \quad \text{d.}$$

As previously described the value of each pixel is encoded in RGBA color space, comprising of the following fragments: red (R), green (G), blue (B) and alpha (A). Each subscript of following subscripts (assigned to values) indicates the value affiliation:

(t) Indicates target value.
(s) Indicates clear template value.
(w) Indicates white value.
(b) Indicates black value.
(i) Indicates insert infographic value.

In Step 214, the insertion routine may be repeated for the following RI123. In some exemplary embodiments, upon completing the replacing of all the pixels of the given RI123 of the given frame, steps 212 and 213 may be repeated for the following RI123.

In Step 215, the insertion routine may be repeated for the following frame. In some exemplary embodiments, upon completing the replacing of all the pixels of all the RI123 of the given frame, steps 211 thru 214 may be repeated for the frame. It should be noted that, the outcome rendering file (ORF) may be ready for casting or streaming upon completion of running the insertion routine for all RI123 of all frames.

Figure 2C:
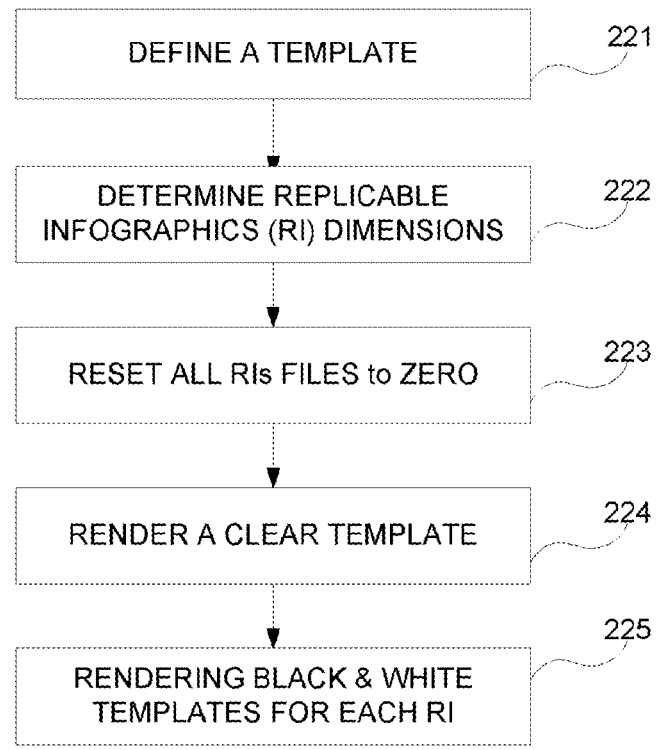
FIGS. 2C and 2D shows a flowchart diagram of a method for embedding color palette branding, in accordance with some exemplary embodiments of the disclosed subject matter.

Referring now to FIG. 2C shows a flowchart diagram of a method for embedding color palette branding, in accordance with some exemplary embodiments of the disclosed subject matter.

In Step 221, a template may be defined. In some exemplary embodiments, step 221 may be similar to step 201 of FIG. 2A.

In Step 222, X-Y dimensions of each selected RI may be determined. In some exemplary embodiments, step 222 may be similar to step 202 of FIG. 2A.

In Step 223, all the RI 123 files may be reset to transparent. In some exemplary embodiments, step 223 may be similar to step 203 of FIG. 2A.

In Step 224, a clear template may be rendered. In some exemplary embodiments, step 224 may be similar to step 204 of FIG. 2A.

In Step 225, a set of black and white renderings may be rendered for each RI 123. In some exemplary embodiments, a rendered black rendering comprises the clear template and all the RI 123. Wherein the content of one RI 123, such as RI 123a, was replaced with content of a black pattern (BP), and the rest of the RI 123 remain transparent. In other exemplary embodiments, a rendered white rendering comprises the clear template and all the RI 123. Wherein the content of one RI 123, such as RI 123a, was replaced with content of a white pattern (BP), and the rest of the RI 123 remain transparent.

The rendering result may be a file labeled as "rendering BP of RI 123a" which may be stored in rendering's repository. Upon completion of rendering RI 123a with black pattern and white pattern, the processes, depicted above, may be repeated for the next RI 123, and so on until the last RI123 is rendered with black and white patterns and stored in the rendering repository, which lossless storage.

As previously described, in a video project of the present disclosure, the sizes of all the frames are identical; the amounts of frames in all renderings are equal; and pixel's coordinates of a frame corresponds with pixels of another frame. In some exemplary embodiments, a black and white (B&W) rendering table may be generated. The rows of the "B&W rendering table" may index, at the left column, the (x;y) coordinates of the target pixels of $RI_j$ in a specific frame $FR_i$. The columns of the "B&W rendering table" may index, at the header row, the black and white renderings for each $RI_j$, wherein the pixel's RGBA values result from the white and black patterns templates rendering with the clear templates.

| B&W RENDERING TABLE For $FR_i$; $RI_j$ | | |
|---|---|---|
| Target Pixel | [WP] | [BP] |
| $x_i$; $y_i$ | $[RGBA]_{0,0}$ | $[RGBA]_{0,0}$ |
| $x_j$; $y_i$ | $[RGBA]_{1,0}$ | $[RGBA]_{1,0}$ |
| . | . | . |
| . | . | . |
| . | . | . |
| $x_{n-1}$; $y_i$ | $[RGBA]_{n-1,0}$ | $[RGBA]_{n-1,0}$ |
| $x_n$; $y_i$ | $[RGBA]_{n,0}$ | $[RGBA]_{n,0}$ |
| . | . | . |
| . | . | . |
| . | . | . |
| $x_i$; $y_j$ | $[RGBA]_{0,1}$ | $[RGBA]_{0,1}$ |
| $x_j$; $y_j$ | $[RGBA]_{1,1}$ | $[RGBA]_{1,1}$ |
| . | . | . |
| . | . | . |

-continued

B&W RENDERING TABLE
For $FR_i$; $RI_j$

| Target Pixel | [WP] | [BP] |
|---|---|---|
| $x_{n-1}$; $y_j$ | $[RGBA]_{n-1,1}$ | $[RGBA]_{n-1,1}$ |
| $x_n$; $y_j$ | $[RGBA]_{n,1}$ | $[RGBA]_{n,1}$ |
| . | . | . |
| . | . | . |
| . | . | . |
| $x_i$; $y_{n-1}$ | $[RGBA]_{0,n-1}$ | $[RGBA]_{0,n-1}$ |
| $x_j$; $y_{n-1}$ | $[RGBA]_{1,n-1}$ | $[RGBA]_{1,n-1}$ |
| . | . | . |
| . | . | . |
| . | . | . |
| $x_{n-1}$; $y_{n-1}$ | $[RGBA]_{n-1,n-1}$ | $[RGBA]_{n-1,n-1}$ |
| $x_n$; $y_{n-1}$ | $[RGBA]_{n,n-1}$ | $[RGBA]_{n,n-1}$ |
| . | . | . |
| . | . | . |
| . | . | . |
| $x_i$; $y_n$ | $[RGBA]_{0,n}$ | $[RGBA]_{0,n}$ |
| $x_j$; $y_n$ | $[RGBA]_{1,n}$ | $[RGBA]_{1,n}$ |
| . | . | . |
| . | . | . |
| . | . | . |
| $x_{n-1}$; $y_n$ | $[RGBA]_{n-1,n}$ | $[RGBA]_{n-1,n}$ |
| $x_n$; $y_n$ | $[RGBA]_{n,n}$ | $[RGBA]_{n,n}$ |

Figure 2D:
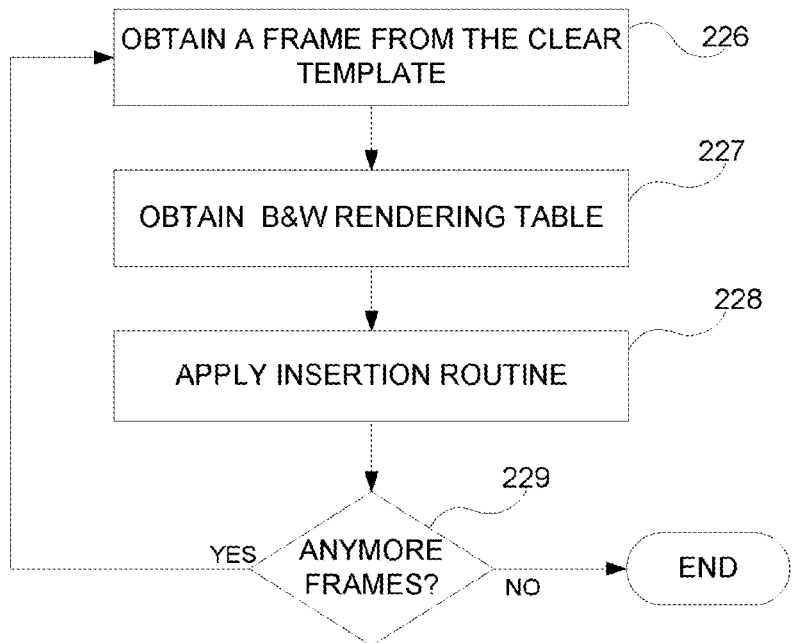

Referring now to FIG. 2D shows a flowchart diagram of a method for embedding color palette branding, in accordance with some exemplary embodiments of the disclosed subject matter.

In Step 226 a frame of the clear template may be obtained. In some exemplary embodiments, step 226 may be similar to step 211 of FIG. 2B.

In Step 227, a "B&W rendering table" may be obtained. In some exemplary embodiments, the "B&W rendering table" comprises the pixel's values, resulted from B&W rendering, of all the RIs that are present in the frame that was obtained in the previous step.

In Step 228, the applied insertion routine may be a color insertion routine. In some exemplary embodiments, the color insertion routine of step 228 may be similar to the insertion routine of step 213 of FIG. 2B. Except that values associated with the source pixels (s) may be replaced with constants (K). Wherein, $K_r$, $K_g$, $K_b$ and $K_a$ are defined by the user and thus the formulas are given as follows:

$R_t = R_b A_i + K_r (1 - A_i) + (R_w - R_b) A_i R_i$   a.

$G_t = G_b A_i + K_g (1 - A_i) + (G_w - G_b) A_i G_i$   b.

$B_t = B_b A_i + K_b (1 - A_i) + (B_w - B_b) A_i B_i$   c.

$A_t = A_b A_i + K_a (1 - A_i) + (A_w - A_b) A_i$   d.

It should be noted it will be noted that step 228 may be repeated for all the RI123 of the given frame.

In Step 229, the insertion routine may be repeated for the following frame. In some exemplary embodiments, step 229 may be similar to step 215 of FIG. 2B.

Figure 2E:
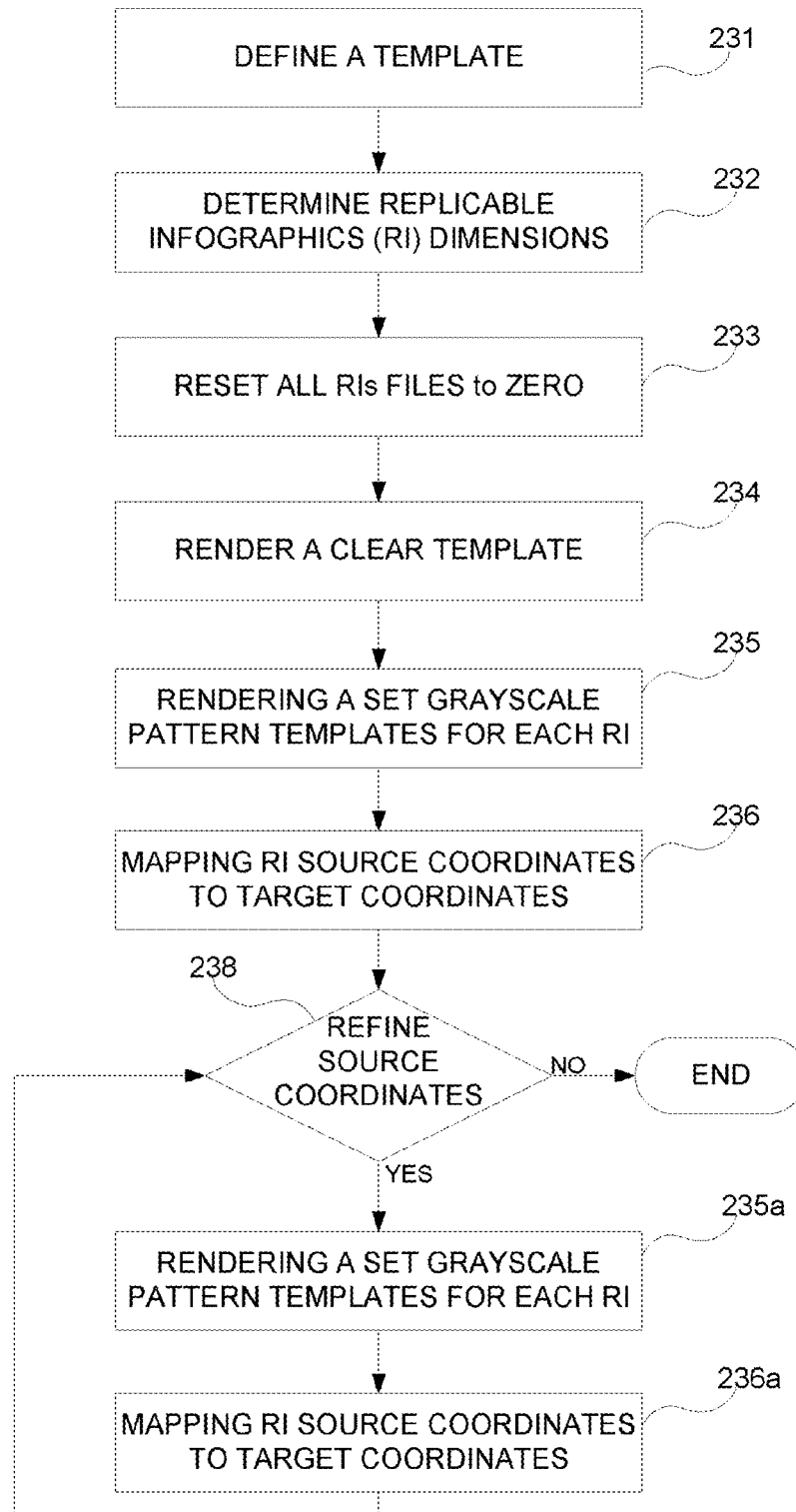
FIGS. 2E and 2F shows a flowchart diagram of a method for embedding infographics, in accordance with some exemplary embodiments of the disclosed subject matter.

Referring now to FIG. 2E showing a flowchart diagram of a grayscale method for embedding infographics, in accordance with some exemplary embodiments of the disclosed subject matter.

In Step 231, a template may be defined. In some exemplary embodiments, step 231 may be similar to step 201 of FIG. 2A.

In Step 232, X-Y dimensions of each selected RI may be determined. In some exemplary embodiments, step 232 may be similar to step 202 of FIG. 2A.

In Step 233, all the RI 123 files may be reset to transparent. In some exemplary embodiments, step 233 may be similar to step 203 of FIG. 2A.

In Step 234, a clear template may be rendered. In some exemplary embodiments, step 234 may be similar to step 204 of FIG. 2A.

Figure 5H:
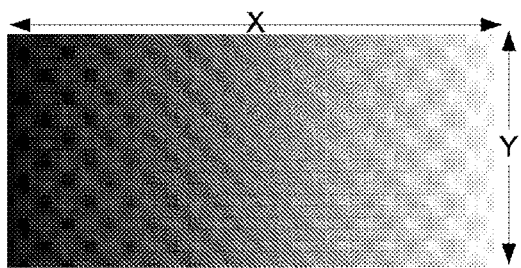
FIGS. 5H to 5HD and FIGS. 5V to 5VD, illustrate examples of horizontal and vertical grayscale patterns, in accordance with some exemplary embodiments of the disclosed subject matter.
Figure 5V:
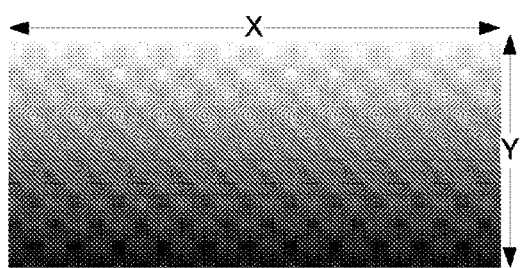
Figure 5H:
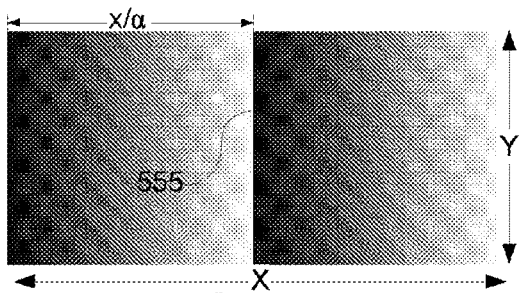
Figure 5V:
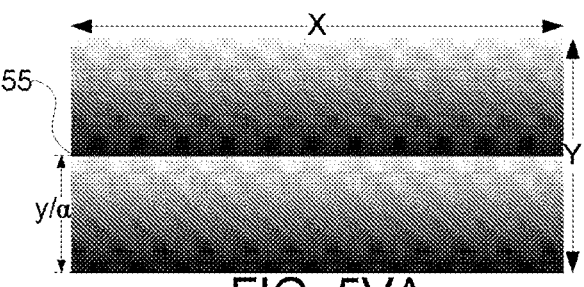
Figure 5H:
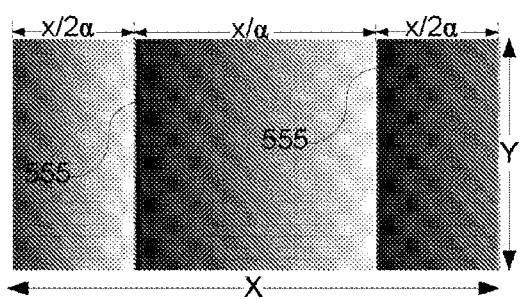
Figure 5V:
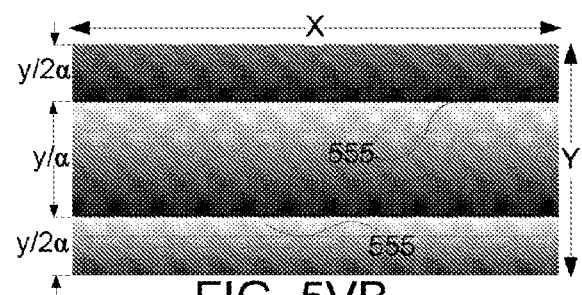
Figure 5H:
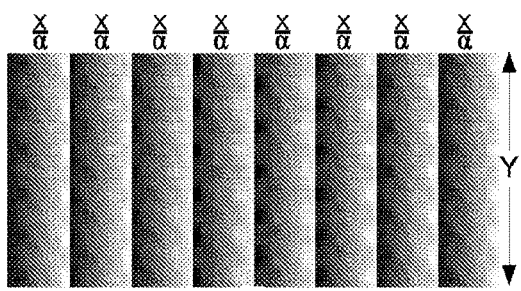
Figure 5V:
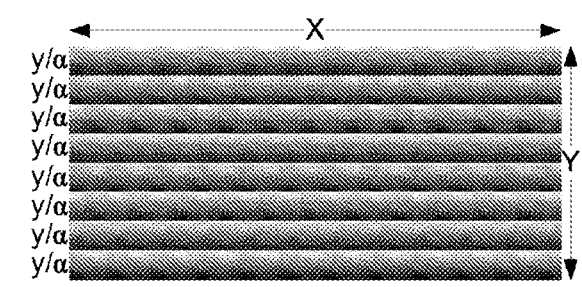
Figure 5H:
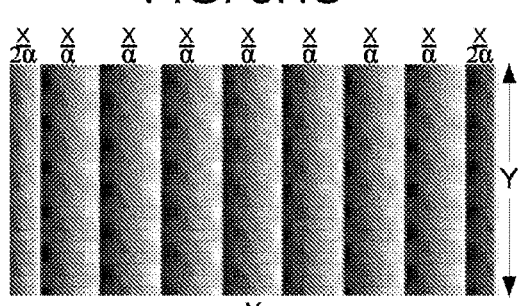
Figure 5V:
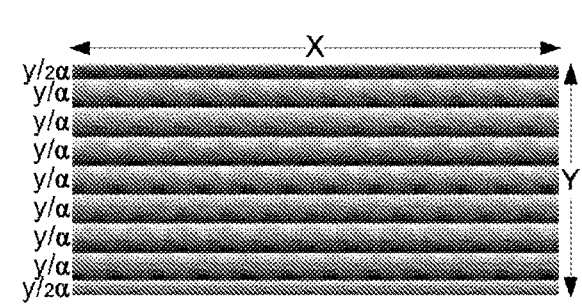

Referring now to FIGS. 5H, 5HA, 5HB, 5HC and 5HD illustrating examples of horizontal grayscale patterns; and FIGS. 5V, 5VA, 5VB, 5VC and 5VD illustrating examples of vertical grayscale patterns; in accordance with some exemplary embodiments of the disclosed subject matter.

Each pattern of the patterns depicted in FIGS. 5H, 5HA, 5HB, 5HC, 5HD, 5V, 5VA, 5VB, 5VC and 5VD may be graphic representation of an image that may be visualize on viewing device, such as television set, computer screen, or the like. The graphic representation content, such as color, shape, size and other parameters characterizing each pattern may is digital information stored as a computer file. A pattern (horizontal or vertical) may be viewed as a matrix of pixels having a size (dimensions) that is measured by the number of pixels on X axis by the number of pixels on Y axis. For example, a 256 by 128 pattern is a pattern, wherein X=256 pixels and Y=128 pixels, thus the total number of pixels in the pattern, of this example, is 256×128=32,768 pixels. It should be noted that, the Y axis indicates rows of the matrix while the X axis indicates column of the matrix. It should be also noted that, the size of the patters (X;Y) may overlap RI123 sizes.

In some exemplary embodiments, each horizontal or vertical pattern may be comprised of at least one gradient shapes, wherein a gradient shape may be a two dimensional shape that gradually and linearly changes from one color to another across or along the two dimensional shape. The colors of the shapes are in a grayscale or gray-shade palette. In some exemplary embodiments, the two dimensional shape may be shapes that gradually change from black to white, gray to white, black to gray, white to black, a combination thereof, or the like.

In some exemplary embodiments, the gradient shapes comprised in a horizontal or vertical pattern may have equal size and their sum per pattern may be a, user defined, real number factor (a), for example: a of FIGS. 5H, and 5V is 1; a of FIGS. 5HA, and 5VA is 2; and the a of FIGS. 5HC, and 5VC is 8. Additionally or alternatively, the sum of gradient shapes comprised in a horizontal or vertical pattern may be (α+1), such as FIGS. 5HB, 5HD, 5VB, and 5VD, providing that α>1. It should be noted that in such embodiments, the size shapes situated at the edges of the patters is half the size $$\left(\frac{X}{2\alpha}\right)$$

of the rest of the shapes in the pattern, for example: FIG. 5HB have two half size $$\left(\frac{X}{2\alpha}\right)$$

shapes and one regular size shape $$\left(\frac{X}{\alpha}\right),$$

thus $$\left\{\frac{X}{2\alpha} + \frac{X}{\alpha} + \frac{X}{2\alpha} = X\right\}$$

since α=2 in this example.

In some exemplary embodiments, the present discloser system for embedding infographics in a video project, may utilize at least one plurality of patterns, wherein the dimensions (X-Y) of all the patterns (horizontal and vertical alike) of the plurality of patterns are identical, however, different in shape from each other. Each plurality of patterns, of the at least one plurality of patterns, may be associated to a specific RI 123, because the dimensions of deferent RI 123 may differ from one another.

Returning now to FIG. 2E. In Step 235, a set of patterns renderings may be rendered for each RI 123. In some exemplary embodiments, a process of rendering patterns renderings comprises the clear template and all the RI 123. Wherein the content of one RI 123, such as RI 123*a*, was replaced with content of a horizontal coarse pattern, such as the pattern depicted in FIG. 5H, and the rest of the RI 123 remain transparent. It should be noted that in the present disclosure, a coarse comprise a single gradient shape, since the (a) of a single gradient shape equal to 1. The rendering result may be a file labeled as "rendering 1αH of RI 123*a*" which may be stored in a, lossless, rendering's repository. In some exemplary embodiments, the process of rendering patterns renderings, depicted above, may be repeated with a vertical coarse pattern, such as the pattern depicted in FIG. 5V, with the same RI123*a*, and may be labeled as "rendering 1αV of RI 123*a*". Similarly, the process the process may be repeated for all the remaining RI 123, until the last pattern rendering of the last RI 123*n* is rendered and stored as "rendering 1αH of RI 123*n*" and "rendering 1αV of RI 123*n*".

Additionally or alternatively, two additional patterns, a black (B) pattern and a white (W) pattern, may be added to the plurality of patterns of each RI123. It will be noted B and W patterns are patterns in which each pixel of the RI are either black or white respectively. In some exemplary embodiments, the process of rendering patterns renderings may be employed to add a "rendering BP" and a "rendering WP" to the patterns renderings set of each RI 123.

In step 236, source coordinates of RI 123 may be mapped to the target coordinates. In some exemplary embodiments, the mapping may be viewed as a position pointer that is pointing on a position, for each pixel having source coordinates, on the target coordinates of each MSS frame. Thus, the mapping determines the position in which an insert infographic associated with a given RI 123 may be embedded.

In some exemplary embodiments, pixels having values that are equal to corresponding pixels in corresponding frames, of the clear template, black and white renderings of a given RI, may be discarded. In some exemplary embodiments, the source coordinates of the remaining (were not discarded) target pixels of a given frame ($FR_i$) associated with rendered (RI) rendering may be determined and populated, respectively, into a pixel's mapping look-up table (LUT), such as the example table depicted below.

A process of determining the X and Y source coordinates ($X_s$; $Y_s$) may begin by obtaining a value (D), of a given target (x,y) pixel, from a rendering, such as 1αH of RI 123*a* rendering. The $X_s$ determining may be given by the following equation $$X_s = \frac{D - [BP]}{[WP] - [BP]} X,$$

wherein X may be an overall horizontal dimension of the pattern as depicted in FIG. 5. Similarly, the Y source coordinates ($Y_s$) of the given target (x,y) pixel may be determined. Wherein, $$Y_s = \frac{D - [BP]}{[WP] - [BP]} * Y,$$

and may be an overall vertical dimension of the pattern as depicted in FIG. 5. Either $X_s$ or $Y_s$ outcome, determined for any target pixel, updates the, X or Y source coordinates column of the any target pixel row in the pixel's mapping LUT. The pixel's mapping LUT updating may be completed upon determining all the $Y_s$ and $X_s$ coordinates of all the target pixels of a given FRi and a given RIj. This process may be repeated for all the frames of all the patterns renderings of each RI 123. As an example, a total of RI is 3 and 100 frame per rendering, will result in 300 pixel's mapping LUTs. In some exemplary embodiments, the tables may be stored in a table's repository.

The rows of the table may index, at the left column, the (x;y) coordinates of the remaining pixels in the specific frame (FRi) of the specific RI123 (RIj).

| $FR_i$; $RI_j$ | PIXEL's MAPPING LOOK-UP TABLE | | | |
|---|---|---|---|---|
| Target Pixels Coordinates | WP pixel Value | BP pixel Value | Source Pixels X-coordinates | Source Pixels Y-coordinates |
| $x_i; y_i$ | $[RGBA]_{i,i}$ | $[RGBA]_{i,i}$ | $X_j$ | $Y_j$ |
| $x_j; y_i$ | $[RGBA]_{j,i}$ | $[RGBA]_{j,i}$ | $X_i$ | $Y_j$ |
| . | . | . | . | . |
| . | . | . | . | . |
| $x_{n-1}; y_i$ | $[RGBA]_{n-1,i}$ | $[RGBA]_{n-1,i}$ | $X_{m-1}$ | $Y_j$ |
| $x_n; y_i$ | $[RGBA]_{n,i}$ | $[RGBA]_{n,i}$ | $X_m$ | $Y_j$ |
| . | . | . | . | . |
| $x_i; y_j$ | $[RGBA]_{i,j}$ | $[RGBA]_{i,j}$ | $X_j$ | $Y_i$ |
| $x_j; y_j$ | $[RGBA]_{j,j}$ | $[RGBA]_{j,j}$ | $X_i$ | $Y_i$ |
| . | . | . | . | . |
| $x_{n-1}; y_j$ | $[RGBA]_{n-1,j}$ | $[RGBA]_{n-1,j}$ | $X_{m-1}$ | $Y_i$ |
| $x_n; y_j$ | $[RGBA]_{n,j}$ | $[RGBA]_{n,j}$ | $X_m$ | $Y_i$ |
| . | . | . | . | . |
| $x_i; y_{n-1}$ | $[RGBA]_{i,n-1}$ | $[RGBA]_{i,n-1}$ | $X_j$ | $Y_{m-1}$ |
| $x_j; y_{n-1}$ | $[RGBA]_{j,n-1}$ | $[RGBA]_{j,n-1}$ | $X_i$ | $Y_{m-1}$ |
| . | . | . | . | . |
| $x_{n-1}; y_{n-1}$ | $[RGBA]_{n-1,n-1}$ | $[RGBA]_{n-1,n-1}$ | $X_{m-1}$ | $Y_{m-1}$ |
| $x_n; y_{n-1}$ | $[RGBA]_{n,n-1}$ | $[RGBA]_{n,n-1}$ | $X_m$ | $Y_{m-1}$ |
| . | . | . | . | . |

-continued

| FR$_i$; RI$_j$ | PIXEL's MAPPING LOOK-UP TABLE | | | |
|---|---|---|---|---|
| Target Pixels Coordinates | WP pixel Value | BP pixel Value | Source Pixels X-coordinates | Source Pixels Y-coordinates |
| $x_i$; $y_n$ | $[RGBA]_{i,n}$ | $[RGBA]_{i,n}$ | $X_j$ | $Y_m$ |
| $x_j$; $y_n$ | $[RGBA]_{j,n}$ | $[RGBA]_{j,n}$ | $X_i$ | $Y_m$ |
| . | . | . | . | . |
| . | . | . | . | . |
| . | . | . | . | . |
| $x_{n-1}$; $y_n$ | $[RGBA]_{n-1,n}$ | $[RGBA]_{n-1,n}$ | $X_{m-1}$ | $Y_m$ |
| $x_n$; $y_n$ | $[RGBA]_{n,n}$ | $[RGBA]_{n,n}$ | $X_m$ | $Y_m$ |

In Step 238, the source coordinates determination may be refined. In one exemplary embodiment, a refinement may be required if the previous source coordinates determination was based on coarse patterns. Alternatively, the refinement may be user defined, regardless of the type or the amount of prior refinements cycles.

In Step 235a, a set of patterns renderings may be rendered for each RI 123. In some exemplary embodiments, the process of rendering patterns renderings of step 235a may be similar to step 235 above except the following change. Instead of rendering each RI123 with one vertical and one horizontal coarse pattern, each RI123 rendering process, in step 235a, will be done with two vertical and two horizontal patterns. It should be noted that, the rendering process, as depicted in step 235, will remain the same. In some exemplary embodiments, with two vertical and two horizontal patterns may formed/shaped based on the user defined, factor ($\alpha$). In step 235a (refining routine) $\alpha>1$, thus (contrary to coarse patterns) two or more horizontal and vertical patterns may be used. As an example, if $\alpha=2$, the at least two horizontal and patterns would be the patterns depicted in FIGS. 5HA, 5HB, 5VA, and 5VB. As yet another example, if $\alpha=8$, the at least two horizontal and patterns would be the patterns depicted in FIGS. 5HC, 5HD, 5VC, and 5VD. In view of the above a total of four renderings may be rendered for each RI123, 1$^{st}$ and 2$^{nd}$ horizontal renderings plus 1$^{st}$ and 2$^{nd}$ vertical renderings, which will be stored in the lossless renderings repository.

In Step 236a, source coordinates of RI 123 may be mapped to the target coordinates. In some exemplary embodiments, mapping source coordinates of RI 123 to the target coordinates of step 236a may be similar to step 235 above except the process of determining $X_s$ and $Y_s$. The process of determining $X_s$ and $Y_s$ may be replaced by a process of refining the $X_s$ and $Y_s$ determining with refined $X_s$ (reX$_s$) and $Y_s$ (reY$_s$). Step 236a may begin by obtaining, the previously determined, $X_s$ and $Y_s$ of a given pixel from the pixel's mapping LUT.

obtaining $X_s$ and $Y_s$

Upon obtaining $X_s$, its coordinate value may be marked as vertical line (not shown), on the two horizontal patterns, such as FIGS. 5HA and 5HB. In some exemplary embodiments, the two patterns, each having the line marking, may be used for selecting which rendered horizontal, rendering out of the two, rendered horizontal, rendering is most appropriate, for determining reX$_s$. In some exemplary embodiments, the pattern out of the two patterns, in which the distance between X$_s$ line coordinate to the nearest edge 555 is larger, may be selected. Thus, the rendered horizontal rendering based on the selected pattern may be most appropriate, for determining the reX$_s$.

Upon obtaining Y$_s$, its coordinate value may be marked as a horizontal line (not shown), on the two vertical patterns, such as FIGS. 5VA and 5VB. In some exemplary embodiments, the two patterns, each having the line marking, may be used for selecting which rendered vertical, rendering out of the two, rendered vertical, rendering is most appropriate, for determining reY$_s$. In some exemplary embodiments, the pattern out of the two patterns, in which the distance between Y$_s$ line coordinate to the nearest edge 555 is larger, may be selected. Thus, the rendered vertical rendering based on the selected pattern may be most appropriate, for determining the reY$_s$.

Following the determination of most appropriate horizontal and vertical renderings of the given target pixel (x,y). The, given target pixel, values Dx and Dy may be obtained from the preferred horizontal and vertical renderings, respectively. In some exemplary embodiments, The reX$_s$ and reY$_s$ determination may be given by the following equations:

$$reXs=\{\{(Dx-[BP])/([WP]-[BP])*X\}/\alpha\}+Xoffset$$

Wherein X may be an overall horizontal dimension of the pattern, and the term "Xoffset" in the present discloser refers to the distance from the left side of a horizontal pattern to the edge 555 situated on the left of the Xs coordinate line.

$$reYs=\{\{(Dy-[BP])/([WP]-[BP])*Y\}/\alpha\}+Yoffset$$

Wherein Y may be an overall vertical dimension of the pattern, and the term "Yoffset" in the present discloser refers to the distance from the bottom side of a vertical pattern to the edge 555 situated on the below the Ys coordinate line. It should be noted that Xoffset and Yoffset may be negative.

In some exemplary embodiments, the either reXs and or reYs refinements may be rejected, and Xs and or Ys may be retained in the table; if $|reXs-Xs|>0.25/\alpha$; similarly if $|reYs—Ys|>0.25/\alpha$.

Similar to step 236 either reX$_s$ or reY$_s$ outcome, determined for any target pixel, updates the, X or Y source coordinates column of the any target pixel row in the pixel's mapping LUT. The pixel's mapping LUT updating may be completed upon determining all the reY$_s$ and reX$_s$ coordinates of all the target pixels of a given FRi and a given RIj. This process may be repeated for all the frames of all the patterns renderings of each RI 123.

Figure 2F:
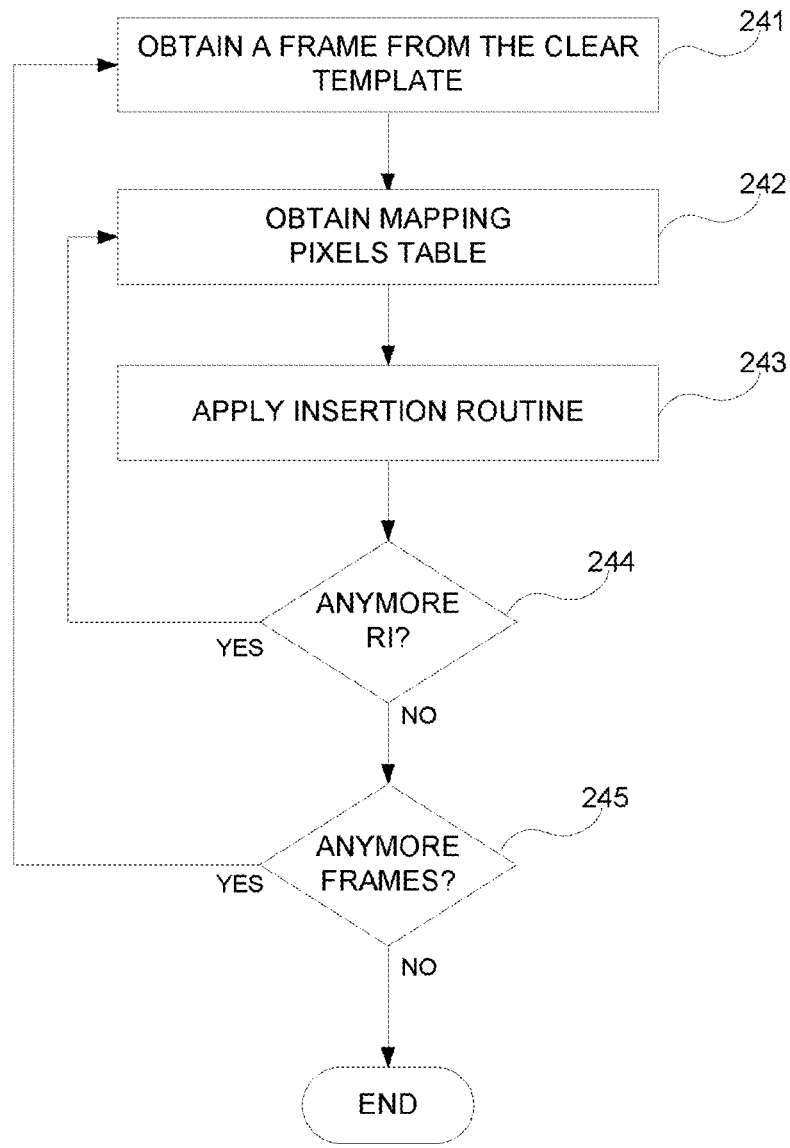

Referring now to FIG. 2F showing a flowchart diagram of a grayscale method for embedding infographics, in accordance with some exemplary embodiments of the disclosed subject matter.

In Step 241 a frame of the clear template may be obtained. In some exemplary embodiments: step 241 may be similar to step 211 of FIG. 2B.

In Step 242 a frame of the clear template may be obtained. In some exemplary embodiments: step 242 may be similar to step 212 of FIG. 2B.

In Step 243 a frame of the clear template may be obtained. In some exemplary embodiments: step 243 may be similar to step 213 of FIG. 2B.

In Step 244 a frame of the clear template may be obtained. In some exemplary embodiments: step 244 may be similar to step 214 of FIG. 2B.

In Step 245 a frame of the clear template may be obtained. In some exemplary embodiments: step 245 may be similar to step 215 of FIG. 2B.

Figure 6:
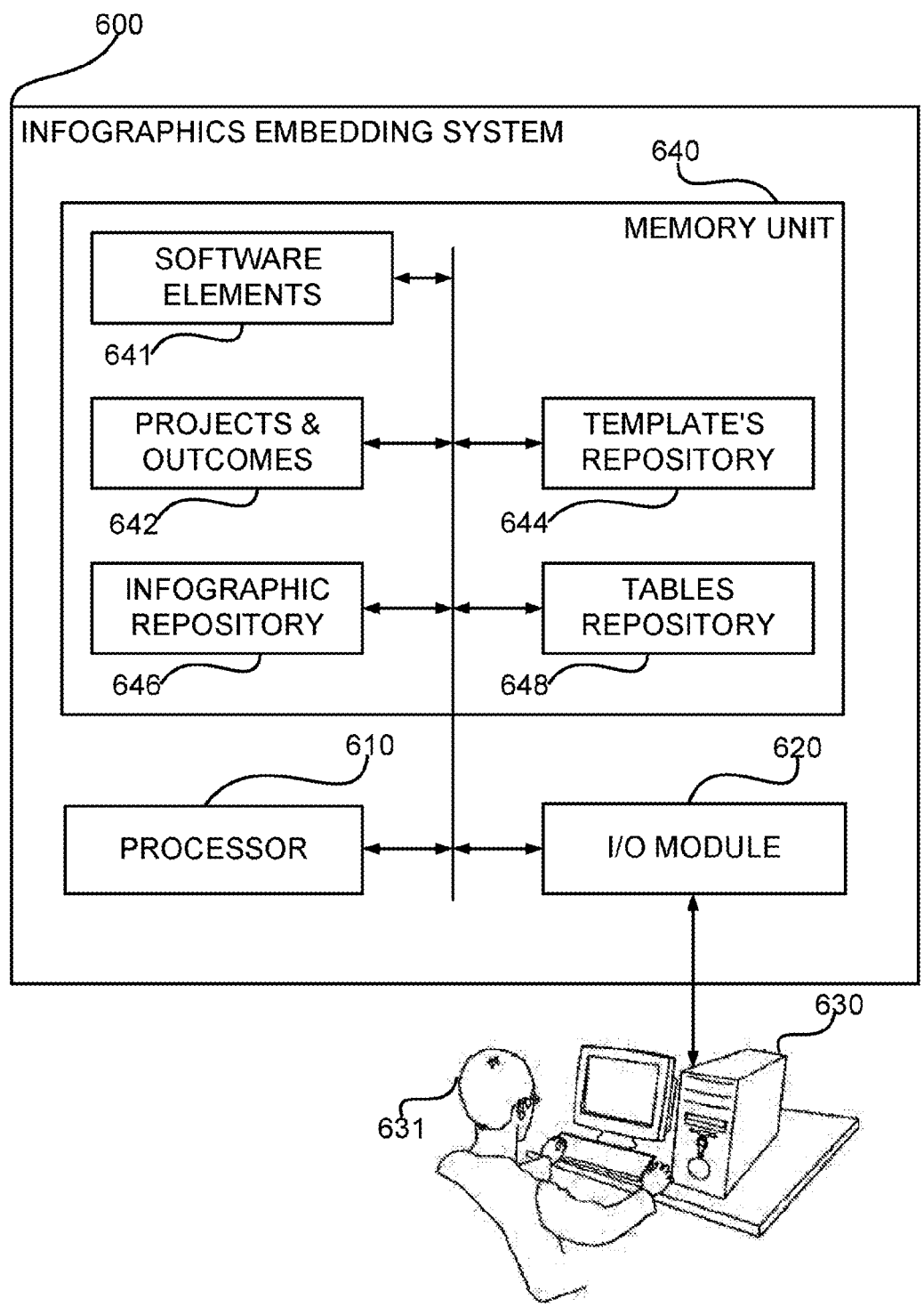
FIG. 6 shows a block diagram of an infographics embedding system, in accordance with some exemplary embodiments of the disclosed subject matter.

Referring now to FIG. 6, showing a block diagram of an infographics embedding system 600, in accordance with some exemplary embodiments of the disclosed subject matter. System 600 may be a computerized apparatus adapted to perform methods such as depicted in FIGS. 2A to 2D.

In some exemplary embodiments, the system 600 may comprise a processor 610. The processor 610 may be a central processing unit (CPU), a microprocessor, an electronic circuit, a plurality of integrated circuits (IC), a combination thereof, or the like. The processor 610 may be utilized to perform computations required by the system 600 or any of it subcomponents.

In some exemplary embodiments of the disclosed subject matter, Apparatus 600 may comprise an input-output (I/O) module 620. I/O module 620 may be utilized as an interface to transmit and/or receive information and instructions between system 600 and external I/O devices, such as a workstation 630, a television screen, a handheld viewing device, a projector, an augmented reality glasses, a combination thereof, or the like.

In some exemplary embodiments, I/O module 620 and workstation 630 may be used to provide an interface to a user 631 of the system, such as by providing, data entry inputs, commands inputs, outputs, visualized images, reports, or the like. In some exemplary embodiments, the visualized images may be video feed, video stream, camera footage, TV program, a collection of raster graphics/images, video rendering outcome, a combination thereof, or the like. Additionally or alternatively, I/O Module 620 may be adapted to perform the method depicted in steps 201 and 202 of FIG. 2A, such as for example enabling the user 631 to select infographics and templates.

In some exemplary embodiments, the system 600 may comprise a memory unit 640. The memory unit 640 may be a hard disk drive, a flash disk, a random access memory (RAM), a memory chip, a flash memory, a combination thereof, or the like. In some exemplary embodiments, memory unit 640 may be used to retain components, such as, software elements 641, projects & outcomes 642, renderings repository 644, infographic repository 646, tables' repository 648, a combination thereof, or the like.

The software elements 641 component may retain program, instructions, functions, and source code files that are operative to cause the processor 610 to perform acts associated with any of the subcomponents of the apparatus 600.

In some exemplary embodiments, the projects & outcomes 642, is a memory module comprising video projects, and video outcomes. The video project may be for example, a video scene, a video clip, still images, a file representing film footage, a combination thereof, or the like. The video project, such as video project 110, of FIG. 1A, may be selected by user 631 for undergoing a process of replacing existing infographic with new ones. The rendered result may be the video outcome.

In some exemplary embodiments, the renderings repository 644 comprises a plurality of modified renderings that were rendered in steps 204 and 205 of FIG. 2A. For each RI there are clear template, white and black renderings as well as a set of patterns renderings, all used to determine the position of a replaceable infographic, such as RI 123.

In some exemplary embodiments, infographic repository 646, comprises files of graphic information, such as animations, still images, visual effects, dynamic, video clips, 2DBM, text string, a combination thereof, or the like. The infographics stored in the infographic repository 646 may be either replaceable infographic or insert infographic.

In some exemplary embodiments, the tables' repository 648 comprises a plurality of modified pixels tables that may be generated in step 206 of FIG. 2A and are used for mapping source coordinates to destination coordinates. The amount of modified pixels tables that may be stored in the table repository, is given the product of the number of frames by the number of RI, for each video project.

The present disclosed subject matter may be a system, a method, and/or a computer program product. The computer program product may include a tangible computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A method of embedding infographics in a digital media file, the method comprising:
    obtaining a video project comprising rendering instructions and indication of an image and at least one replaceable infographic;
    obtaining the image that was indicated, wherein the image is a file comprising at least one digital image frame, and wherein each frame comprises of a plurality of pixels;
    obtaining the at least one replaceable infographic that was indicated, wherein each replaceable infographic is a file that comprises a digital image, wherein the digital image comprises a plurality of source pixels;
    rendering a clear template, wherein the clear template rendering comprises of the image and the at least one replaceable infographic, wherein the pixels values of each replaceable infographic were reset to transparent prior to the rendering, and wherein the clear template comprising at least one frame, and wherein each frame comprising a plurality of target pixels;
    rendering a plurality of pattern images, each having at least one frame, wherein each pattern image comprises of the clear template and one replaceable infographic, wherein the values of the plurality of pixels of the one replaceable infographic are replaced with plurality of pixels that together form a digital graphic pattern, wherein the pattern is selected from a group comprising: white pattern; black pattern; at least one bar pattern; and a combination thereof;
    generating a pixel's mapping table for each replaceable infographic of each frame of the clear template, wherein each table allocate source pixels to target pixels, and wherein the generating a pixel's mapping table comprising extracting from the plurality of pattern images the source pixels location and parameters for each target pixel; and,
    retaining the clear template and the tables of each replaceable infographic of each frame of the clear templates, wherein the clear template and the tables are an outcome of a video project.

2. The method of claim 1, comprising:
    obtaining the outcome of the video project;
    obtaining the at least one insert infographic, wherein each replaceable infographic is a file comprising a digital image, wherein the digital image is comprising a plurality of pixels; and,
    applying an insertion routine to replace values of each pixel of the plurality of pixels of each replaceable infographic of the least one replaceable infographic in each frame of the clear template with values of each pixel of the plurality of pixels of each insert infographic of the at the least one insert infographic, wherein the insertion routine utilize the pixel's mapping tables for allocating the each pixel of the plurality of pixels of each insert infographic of the at the least one insert infographic.

3. The method of claim 2, wherein the pattern is selected from a group comprising: white pattern; black pattern; at least one grayscale pattern; and a combination thereof.

4. A method of embedding infographics in a digital media file, the method comprising:
obtaining a video project that comprises rendering instructions and indication of an image and at least one replaceable infographic;
obtaining the image that was indicated, wherein the image is a file comprising at least one digital image frame, and wherein each frame comprises of a plurality of pixels;
obtaining the at least one replaceable infographic that was indicated, wherein each replaceable infographic is a file that comprises a digital image, wherein the digital image comprises a plurality of source pixels;
rendering a clear template, wherein the clear template rendering comprises of the image and the at least one replaceable infographic, wherein the pixels values of each replaceable infographic were reset to transparent prior to the rendering, and wherein the clear template comprises at least one frame, and wherein each frame comprises a plurality of target pixels;
rendering a plurality of pattern images, each having at least one frame, wherein each pattern image comprises of the clear template and one replaceable infographic, wherein the values of the plurality of pixels of the one replaceable infographic are replaced with plurality of pixels that together form a digital graphic pattern, wherein the pattern is selected from a group comprising: white pattern; and black pattern;
generating a black and white rendering table for each replaceable infographic of each frame of the clear template; and
retaining the clear template and the a black and white rendering table wherein the clear template and the tables, are an outcome of a video project.

5. The method of claim 4, comprising:
obtaining the outcome of a video project;
obtaining at least one replaceable infographic color, wherein each color of each replaceable infographic is a constant value; and,
applying a color insertion routine for replacing values of each pixel of the plurality of pixels of each replaceable infographic of the least one replaceable infographic in each frame of the clear template with the constant value, wherein the color insertion routine is repeated for each replaceable infographic in each frame.

6. A system for embedding infographics in a digital media file comprising:
a processor;
a memory unit communicatively connected to the processors, the memory unit comprising: an infographic repository; a tables repository; a templates repository; a projects and outcomes repository; and a software elements repository containing instructions that when executed by the processors perform: obtaining a video project from the projects and outcomes repository comprising rendering instructions and indication of an image and at least one replaceable infographic; obtaining the image that was indicated, wherein the image is a file comprising at least one digital image frame, and wherein each frame comprises of a plurality of pixels; obtaining the at least one replaceable infographic that was indicated from the infographic repository, wherein each replaceable infographic is a file that comprises a digital image, wherein the digital image comprises a plurality of source pixels; rendering a clear template from the templates repository, wherein the clear template rendering comprises of the image and the at least one replaceable infographic, wherein the pixels values of each replaceable infographic were reset to transparent prior to the rendering, and wherein the clear template comprising at least one frame, and wherein each frame comprising a plurality of target pixels; rendering a plurality of pattern images, each having at least one frame, wherein each pattern image comprises of the clear template and one replaceable infographic, wherein the values of the plurality of pixels of the one replaceable infographic are replaced with plurality of pixels that together form a digital graphic pattern, wherein the pattern is selected from a group comprising: white pattern; black pattern; at least one bar pattern; and a combination thereof; generating a pixel's mapping table in the tables repository for each replaceable infographic of each frame of the clear template, wherein each table allocate source pixels to target pixels, and wherein the generating a pixel's mapping table comprising extracting from the plurality of pattern images the source pixels location and parameters for each target pixel; and, retaining the clear template in the templates' repository and the tables in the tables repository of each replaceable infographic of each frame of the clear templates, wherein the clear template and the tables are an outcome of a video project.

7. The system of claim 6, wherein the software elements repository of the memory unit further containing instructions that when executed by the processors perform: obtaining the outcome of the video project; and, obtaining the at least one insert infographic from the infographic repository, wherein each replaceable infographic is a file comprising a digital image, wherein the digital image is comprising a plurality of pixels; and, applying an insertion routine to replace values of each pixel of the plurality of pixels of each replaceable infographic of the least one replaceable infographic in each frame of the clear template with values of each pixel of the plurality of pixels of each insert infographic of the at the least one insert infographic, wherein the insertion routine utilize the pixel's mapping tables for allocating the each pixel of the plurality of pixels of each insert infographic of the at the least one insert infographic.

8. The system of claim 7, wherein the pattern is selected from a group comprising: white pattern; black pattern; at least one grayscale pattern; and a combination thereof.

9. A system for embedding infographics in a digital media file comprising:
a processor;
a memory unit communicatively connected to the processors, the memory unit comprising: an infographic repository; a tables repository; a templates repository; a projects and outcomes repository; and a software elements repository containing instructions that when executed by the processors perform: obtaining a video project from the projects' repository that comprises rendering instructions and indication of an image and at least one replaceable infographic; obtaining the image that was indicated, wherein the image is a file comprising at least one digital image frame, and wherein each frame comprises of a plurality of pixels; obtaining the at least one replaceable infographic from the inforgraphic repository that was indicated, wherein each replaceable infographic is a file that comprises a digital image, wherein the digital image comprises a plurality of source pixels; rendering a clear template from the templates' repository, wherein the clear template rendering comprises of the image and the at least one replaceable infographic, wherein the pixels values of each replaceable infographic were reset to transparent prior to the rendering, and wherein the clear template comprises at least one frame, and wherein each frame comprises a plurality of target pixels; rendering a plurality of pattern images, each having at least one frame, wherein each pattern image comprises of the clear template and one replaceable infographic, wherein the values of the plurality of pixels of the one replaceable infographic are replaced with plurality of pixels that together form a digital graphic pattern, wherein the pattern is selected from a group comprising: white pattern; and black pattern; generating a black and white rendering table for each replaceable infographic of each frame of the clear template; and, retaining the clear template in the template repository and the a black and white rendering table in the tables repository wherein the clear template and the tables, are an outcome of a video project.

10. The system of claim 9, wherein the software elements repository containing instructions that when executed by the processors further perform: obtaining the outcome of a video project from the projects repository; obtaining at least one replaceable infographic color, wherein each color of each replaceable infographic is a constant value; applying a color insertion routine for replacing values of each pixel of the plurality of pixels of each replaceable infographic of the least one replaceable infographic in each frame of the clear template with the constant value, wherein the color insertion routine is repeated for each replaceable infographic in each frame.

* * * * *